United States Patent
Stricker

(10) Patent No.: US 6,370,844 B1
(45) Date of Patent: Apr. 16, 2002

(54) PRODUCT PACKAGING ARRANGEMENT USING INVISIBLE MARKING FOR PRODUCT ORIENTATION

(75) Inventor: James C. Stricker, Hinckley, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 09/495,283

(22) Filed: Jan. 31, 2000

(51) Int. Cl.⁷ .............................................. B65B 35/56
(52) U.S. Cl. ............................ 53/446; 53/427; 53/446; 53/544; 53/498
(58) Field of Search ....................... 53/427, 444, 446, 53/498, 148, 544, 509; 706/703, 705, 776, 777, 461

(56) References Cited

U.S. PATENT DOCUMENTS

| | | | |
|---|---|---|---|
| 3,599,389 A | 8/1971 | Hartman | 53/51 |
| 3,675,389 A | 7/1972 | Uline | 53/183 |
| 3,837,890 A | 9/1974 | Sumner et al. | 117/37 R |
| 3,874,227 A | 4/1975 | Focke | 73/94 |
| 4,238,524 A | 12/1980 | LaLiberte et al. | 427/7 |
| 4,239,261 A | 12/1980 | Richardson | 283/21 |
| 4,266,674 A | 5/1981 | Bell et al. | 209/536 |
| 4,480,177 A | 10/1984 | Allen | 235/379 |
| 4,599,958 A * | 7/1986 | Stiers | 112/261.2 |
| 4,680,919 A | 7/1987 | Hirama et al. | 53/469 |
| 4,725,078 A | 2/1988 | Janicki | 283/70 |
| 4,970,389 A | 11/1990 | Danforth et al. | 250/271 |
| 5,093,147 A | 3/1992 | Andrus et al. | 427/7 |
| 5,097,653 A | 3/1992 | Soloman | 53/499 |
| 5,135,569 A | 8/1992 | Mathias | 106/22 |
| 5,298,310 A | 3/1994 | Havens | 428/204 |
| 5,360,235 A | 11/1994 | Drummeter et al. | 283/89 |
| 5,369,273 A | 11/1994 | Fisun et al. | 250/271 |
| 5,401,960 A | 3/1995 | Fisun et al. | 250/271 |
| 5,503,904 A | 4/1996 | Yoshinaga et al. | 428/195 |
| 5,586,657 A * | 12/1996 | Ward et al. | 206/705 |
| 5,623,816 A | 4/1997 | Edwards et al. | 53/478 |
| 5,686,725 A | 11/1997 | Maruyama et al. | 250/271 |
| 5,703,229 A | 12/1997 | Krutak et al. | 540/140 |
| 5,719,948 A | 2/1998 | Liang | 382/112 |
| 5,768,856 A | 6/1998 | Odenthal | 53/443 |
| 5,770,841 A | 6/1998 | Moed et al. | 235/375 |
| 5,801,067 A | 9/1998 | Shaw et al. | 438/15 |
| 5,822,436 A | 10/1998 | Rhoads | 380/54 |
| 5,829,232 A | 11/1998 | Takahashi | 53/499 |
| 5,837,042 A | 11/1998 | Lent et al. | 106/31.14 |
| 5,862,247 A | 1/1999 | Fisun et al. | 382/116 |
| 5,890,350 A | 4/1999 | Tisma | 53/543 |
| 5,915,864 A | 6/1999 | Austin et al. | 400/708 |
| 5,917,925 A | 6/1999 | Moore | 382/101 |
| 6,005,960 A | 12/1999 | Moore | 382/111 |
| 6,073,421 A * | 6/2000 | Lee | 53/206 |

FOREIGN PATENT DOCUMENTS

| WO | WO 99/36317 | 7/1999 | B65B/5/02 |
|---|---|---|---|

* cited by examiner

Primary Examiner—John Paradiso
(74) Attorney, Agent, or Firm—Russell H. Toye, Jr.; Robert Welsh

(57) ABSTRACT

A system and method of arranging products, such as batteries, in a display package according to a desired orientation with efficient space utilization. The method includes providing products to be packaged, and applying an invisible orientation marking on each of the products. The orientation marking is visible when illuminated with ultraviolet light and is generally invisible to consumers under normal ambient light conditions. The method also includes illuminating the products with ultraviolet light, scanning each of the products, detecting the orientation marking on each of the products, orienting each of the products based on the detecting steps, and disposing each of the oriented products in a package so that the products have a desired orientation.

21 Claims, 4 Drawing Sheets

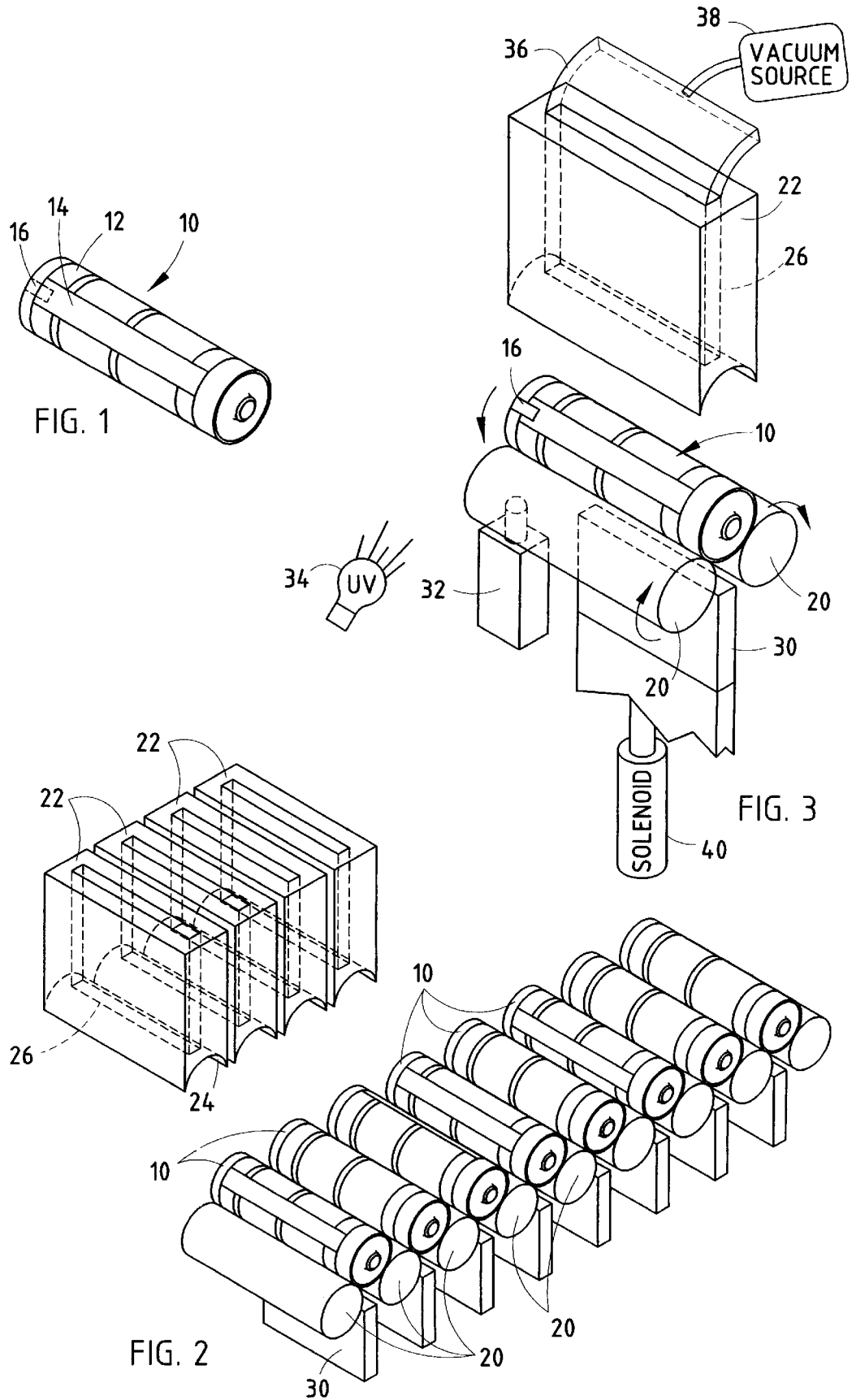

PRODUCT PACKAGING ARRANGEMENT USING INVISIBLE MARKING FOR PRODUCT ORIENTATION

BACKGROUND OF THE INVENTION

The present invention generally relates to product packaging and, more particularly, to a method and system of arranging products, such as alkaline batteries, in display packages according to a desired orientation.

A common practice for packaging and displaying small and lightweight retail items, such as alkaline batteries, is to package the items in thermoformed blister packages and place the packages on shelves or hang the packages on hooks on various display racks. Conventional battery packages are generally composed of a display card which provides a generally stiff supportive backing, usually composed of cardboard, and a thermoformed polymeric blister that is bonded to the display card. The display card provides support for displaying the merchandise for sale and usually contains print with suitable indicia, such as advertising, trademarks, and instructions.

In accordance with one battery packaging approach, the thermoformed blister generally comprises a piece of clear polymeric material, e.g., plastic, heat sealed to the display card. According to another approach, a clam-type thermoformed polymeric blister generally having a shape to fit over and cover the batteries is sandwiched between two layers of the display card. The blister isolates the products from the purchaser and prevents inadvertent damage to the products that can result from repeated handling prior to sale, while further allowing for the orderly display of products for sale to purchasers.

It is sometimes desirable to orient some products, such as alkaline batteries, within the blister package so that the graphics printed on the product label are readily recognized and may appear more attractive to consumers, especially when the products are packaged in clear blister packages. In the past, battery packaging techniques have employed a colored marking, generally in the shape of a bar, printed on the label near one end of the battery to serve as a registration mark for use to orient the battery in a blister package. The conventional colored orientation marking is always visible under normal ambient light conditions. In doing so, an entire circumferential area of the battery is generally dedicated solely to the registration mark, which therefore limits the available space for graphics that may otherwise be applied to the battery label. In today's battery sales market, it has become increasingly desirable to maximize the area available for graphics and print, which includes advertising, trademarks, and instructions, as well as to provide a battery tester on the label of the battery. However, due to the limited amount of space available on small products, such as alkaline batteries, it can be difficult to apply a conventional colored orientation marking.

Accordingly, there is a need, heretofore unfulfilled, for a relatively inexpensive product package arrangement and method of arranging products in a package according to a desired orientation. It is further desirable to provide for product orientation in a display package in a manner that does not limit the amount of space available for print and other features, such as battery testers, on the labels of batteries.

SUMMARY OF THE INVENTION

The present invention provides for a system and method of arranging products, such as batteries, in a display package according to a desired orientation in a manner that allows for maximum utilization of space for graphics. To achieve this and other advantages, and in accordance with the purpose of the invention as embodied and described herein, the present invention provides for a method of providing one or more products to be packaged, and applying an invisible marking on the one or more products. The marking is generally indistinguishable to consumers under ambient light conditions. The method further includes the steps of scanning each of the one or more marked products, detecting the marking on each of the one or more products, orienting each of the one or more products based on the detecting step, and disposing each of the oriented products in a package so that each of the one or more products has a desired orientation.

According to another aspect of the present invention, a battery package is provided comprising a blister package having a housing defining a compartment, and one or more products disposed in the blister package. Each of the one or more products has an orientation marking that is generally invisible to the naked human eye and therefore indistinguishable to consumers under normal ambient light conditions. Each of the one or more products is oriented in a desired orientation in the blister package based on the invisible orientation marking.

According to a further aspect of the present invention, a system of arranging products in a display package is provided comprising a marking device for applying an invisible orientation marking to each of one or more products. The invisible orientation mark is generally indistinguishable to consumers under normal ambient light conditions. The system also has a scanner for scanning each of the products to determine the location of the invisible orientation marking, and a pick up assembly for engaging each of the one or more products based on the detected orientation marking and placing each of the products in a display package so each of the products is oriented in a desired orientation according to the orientation marking. Accordingly, the invisible orientation marking is not readily seen under ambient light conditions and, as such, may be applied over other print indicia without limiting the space available for print and other features.

These and other features, advantages and objects of the present invention will be further understood and appreciated by those skilled in the art by reference to the following specification, claims and appended drawings.

BRIEF DESCRIPTION OF THE DRAWINGS

In the drawings:

FIG. 1 is a perspective view of an alkaline battery having an ultraviolet readable orientation marking applied to the label according to the present invention;

FIG. 2 is a diagrammatic view of a battery packaging assembly for orienting batteries for packaging in blister packages;

FIG. 3 is a diagrammatic view further illustrating the orientation of one battery with the battery packaging assembly of FIG. 2;

DETAILED DESCRIPTION OF THE PREFERRED EMBODIMENT

Figure 4:
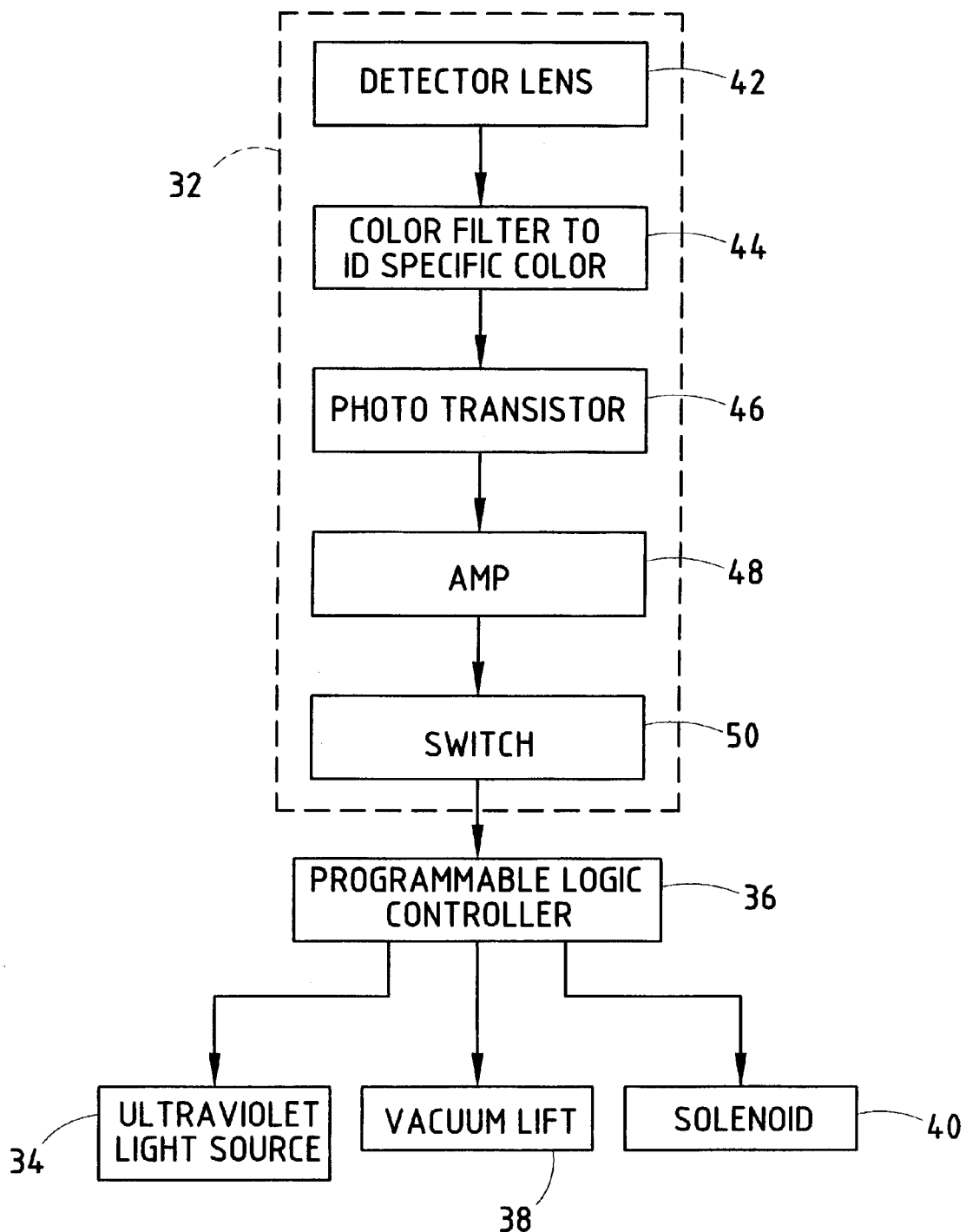
FIG. 4 is a block diagram further illustrating the battery packaging assembly of FIG. 2.

Referring to FIG. 1, a cylindrical alkaline battery 10, i.e., electrochemical cell, is illustrated therein. The battery 10 is shown as a single electrochemical cell having a steel can containing electrochemically active materials. The can has a closed bottom end, cylindrical side walls, and an open top end sealed closed with a cover and seal assembly as is well-known in the battery manufacturing art. The battery 10 also has a label 12 applied to the outer walls of the cylindrical can as is generally known in the art. The battery label 12 may include print containing suitable indicia, such as advertising, trademarks, instructions, and may further include a battery tester or other features. A substantial amount of the space that is available on the battery label 12 may contain print so as to maximize use of the battery label space to advertise the product and provide packaged product that is aesthetically pleasing to consumers.

According to the present invention, the battery 10 has an invisible orientation marking 16 applied on the label 12. The invisible orientation marking 16, shown in phantom, preferably includes an ultraviolet light readable marking that is generally invisible to the naked human eye and is therefore indistinguishable to consumers under normal ambient light conditions. The invisible orientation marking 16 may include a fluorescent agent such as 2,5-thiophenediylbis combined with a polymer such as paint or ink. The invisible orientation marking 16 phosphoresces only when illuminated with ultraviolet light to emit light at a frequency that can be detected by a sensor. Examples of known ultraviolet light readable materials are disclosed in U.S. Pat. Nos. 4,238,524, and 4,725,078. It should be appreciated that the invisible orientation marking 16 may be applied over the top of visible printed ink 14 provided on the battery label 12 and, because the invisible orientation marking 16 is not visible to the naked eye of consumers under normal ambient light conditions, the marking 16 does not interfere with the printed ink 14 provided on the battery label 12. While one orientation marking 16 is shown, it should be understood that two or more orientation markings 16 may be employed on each product.

Referring to FIG. 2, a product orientation assembly for orienting and packaging batteries is illustrated therein. The orientation assembly includes a plurality of rollers 20 spaced apart from one another and arranged side by side to hold and spin product, such as batteries 10. For N number of batteries, the assembly generally requires N+1 rollers. According to the example shown, a total of nine rollers 20 are shown holding eight batteries 10. Rollers 20 are preferably activated by a motor (not shown) to spin in synchronization with each other. Disposed below and between adjacent rollers 20 are a plurality of solenoid actuated push bars 30 which are extendable upward in the space between adjacent rollers 20 and are actuatable to force the battery 10 upward and away from rollers 20.

The orientation assembly further includes a plurality of pickup mechanisms 22 which are movable in position above the batteries 10. Each of pickup mechanisms 22 has a vacuum lift chamber 26 leading to a curved semi-cylindrical bottom surface 24 which conforms to the shape of the cylindrical side walls of the battery 10. Pickup mechanism 22 is actuatable to a position directly above a corresponding battery 10. With a vacuum applied to the vacuum chamber 26 and the push bar 30 actuating a battery 10 upward towards the bottom surface 24 of pickup mechanism 22, the actuated battery 10 is picked up and held by pickup mechanism 20, and is thereafter movable in a desired orientation to a battery package.

Referring to FIG. 3, the orientation of one of batteries 10 is further illustrated therein. During the orientation process, battery 10 is placed on a pair of rollers 20 and an ultraviolet light source 34, preferably located on the same side of battery 10 as a photo detector 32, illuminates the battery 10 with ultraviolet light so as to phosphoresce the fluorescent whitening agent in the invisible orientation marking 16. The ultraviolet light source 34 is applied to at least a portion of the battery label 12 containing the invisible orientation marking 16. The pickup mechanism 22 is further shown assembled to a vacuum hose 36 which leads to a vacuum source 38, such as a reverse pumped air compressor, for creating a vacuum in vacuum chamber 26. The pushup mechanism 30 is further shown connected to a solenoid for actuating the pushup mechanism 30 upward when a certain orientation of battery 10 is detected.

To determine the orientation of the battery 10, photo detector 32 is positioned adjacent to battery 10 at a location to scan for the invisible orientation marking 16. According to the example shown, the photo detector 32 is placed near one end of battery 10 in an area where the orientation marking 16 is expected to be located. As the battery 10 spins in response to rotation of rollers 20, ultraviolet light source 34 illuminates the battery 10 and photo detector 32 detects the presence of orientation marking 16 and, upon reaching a desired orientation, the pushup mechanism 30 is actuated by solenoid 40 to force battery 10 upwards and into a held position on the pickup assembly 22. Additionally, the ultraviolet light source 34 and photo detector 32 could be housed together and aligned with each other to detect the orientation marking 16.

Referring to FIG. 4, the orientation assembly is further illustrated in the block diagram shown therein. The photo detector 32 may include a detector lens 42 for detecting the presence of visible colors when ultraviolet light is applied to the product, and a color filter 44 for identifying a specific predetermined color. In addition, photo detector 32 includes a photo transistor 46, an amplifier 48, and a switch 50 for generating a signal upon detecting the predetermined color indicative of the detection of the orientation marking 16.

The orientation assembly also includes a programmable logic controller (PLC) 58. Controller 58 monitors the signal output from switch 50 of photo detector 32, which indicates the detection of the orientation marking 16. Controller 58 is preferably configured to control actuation of the solenoid 40 to actuate push bar 30 and to control the vacuum generated by vacuum source 38. Further, controller 58 may also control the actuation of ultraviolet light source 34 to turn the ultraviolet light source on and off. It should also be appreciated that controller 58 may control other mechanisms such as the actuation of rollers 20. It should be further appreciated that the assembly shown herein may sense the orientation of any number of products, such as batteries 10, and control any of a number of pickup assemblies, solenoids, and vacuum lifts to orient and package a predetermined number of products at the same time.

Figure 5:
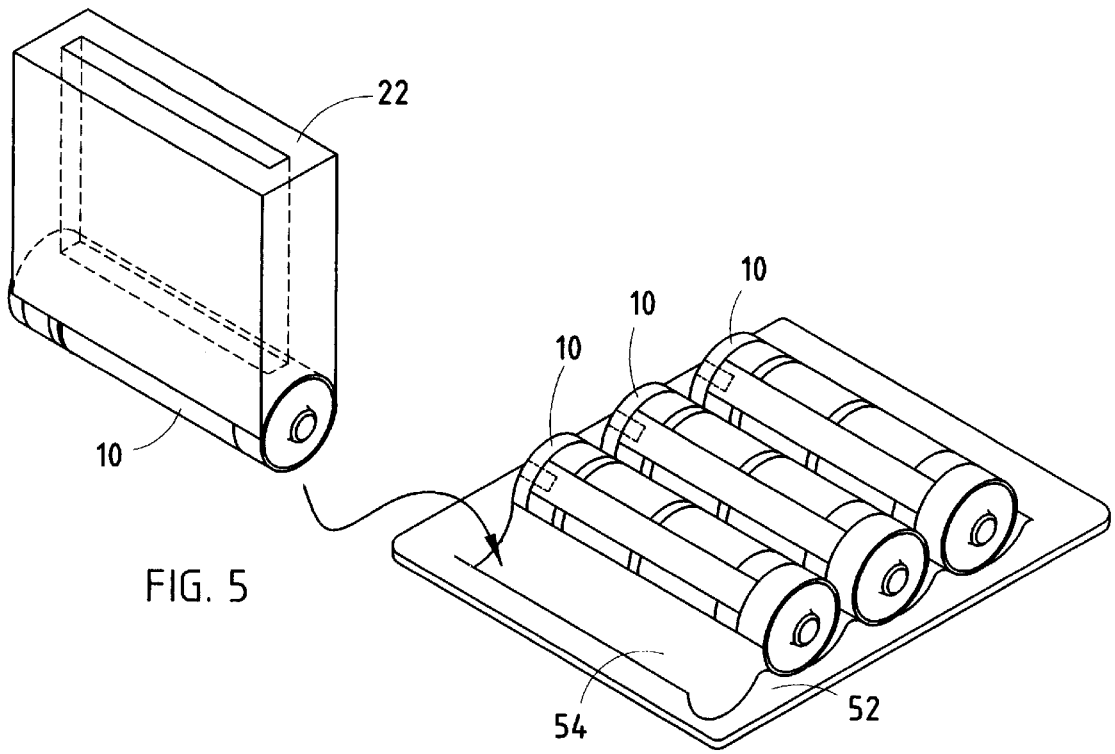
FIG. 5 is a diagrammatic view illustrating the packaging of oriented batteries in a blister package.
Figure 6:
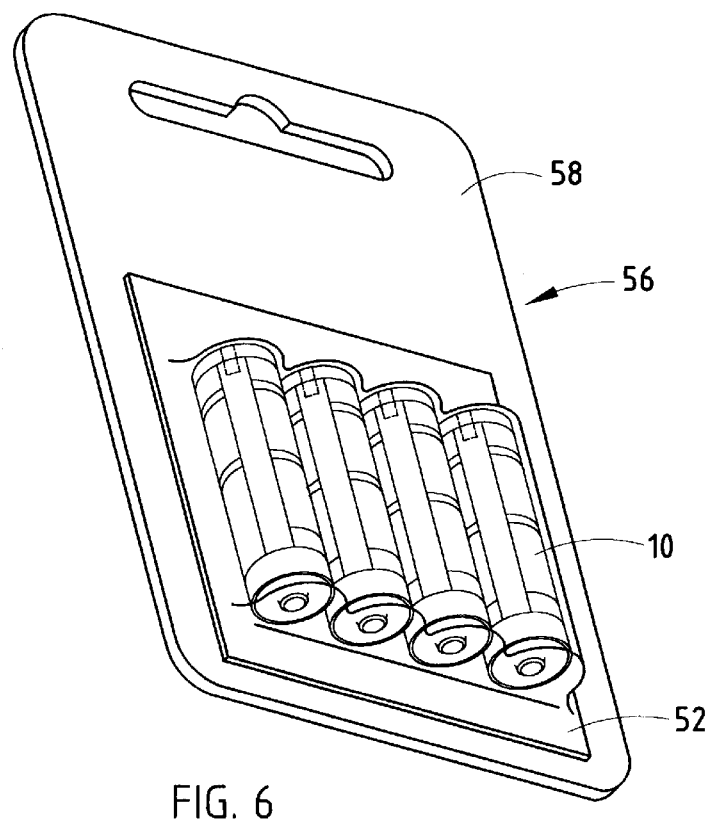
FIG. 6 is a front perspective view of a battery package containing four batteries oriented according to the present invention.

Referring to FIG. 5, the packaging of individual batteries 10 into a clear thermoformed polymeric blister package 52 is illustrated therein. The pickup mechanism 22 is movable to position the battery 10 above the blister package 52 and to dispose the battery 10 into a compartment 54 in blister package 52. Once the battery 10 is disposed in the blister package 52 in the desired orientation, the vacuum source 38 is turned off to release battery 10 from pickup mechanism 22 and mechanism 22 returns to the orientation assembly. As shown, each of the batteries 10 is oriented in a desired orientation with the blister package 52. Once the blister package contains all the batteries with the desired orientation, a display card 58 may be heat sealed or otherwise attached to the blister package to provide a fully assembled battery package 56 as shown in FIG. 6. The display card 58 preferably contains the batteries 10 to prevent movement of the batteries 10 relative to the package following package assembly. Accordingly, each of batteries 10 is oriented in a desired orientation to provide a battery package that is aesthetically pleasing to consumers and has the maximum positive impact on consumers.

Figure 7:
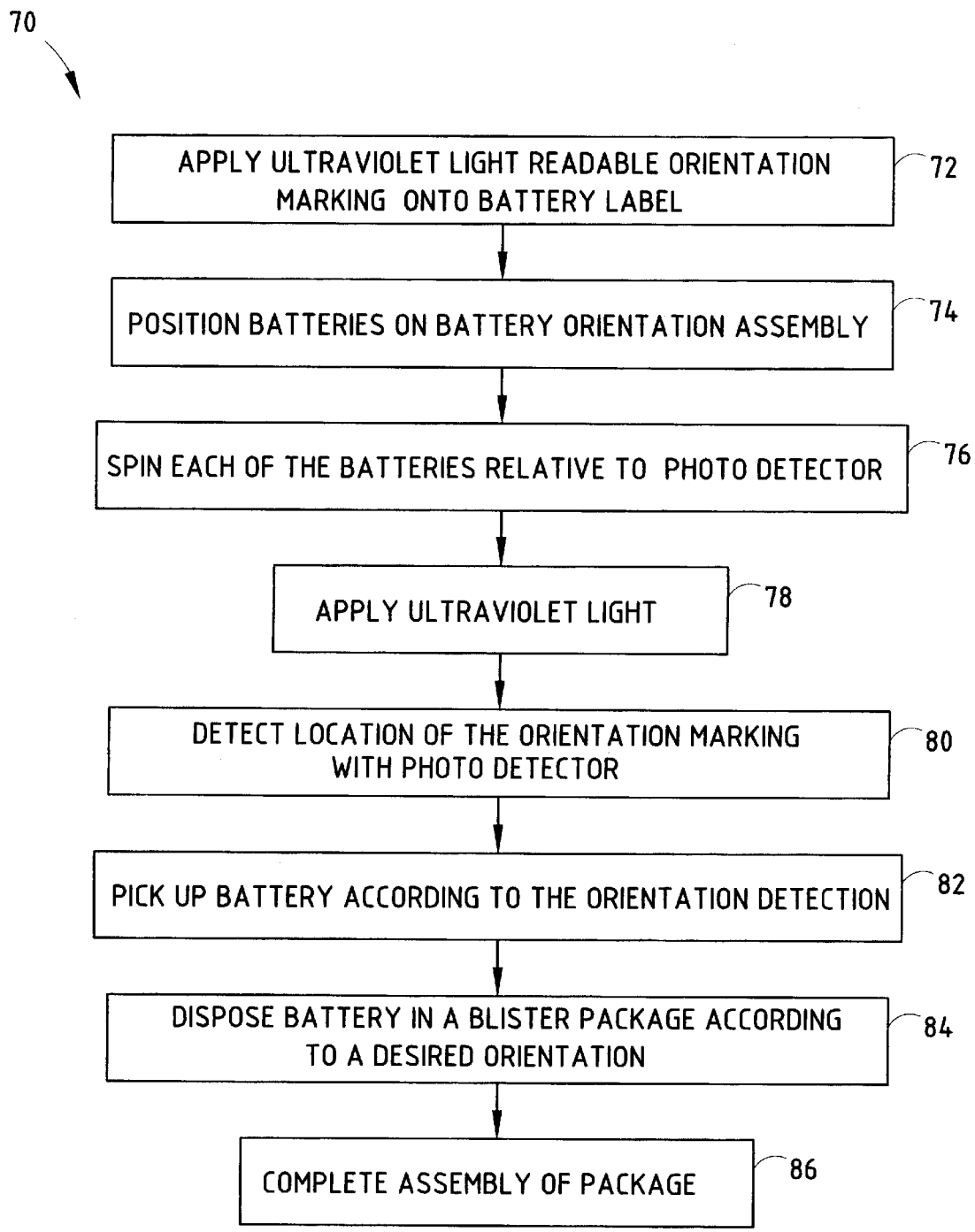
FIG. 7 is a flow diagram illustrating a method of packaging batteries to achieve a desired orientation according to the present invention.

Referring to FIG. 7, a method 70 of orientating and packaging products, such as batteries, in a blister package according to a desired orientation is illustrated therein. The method 70 includes step 72 of applying an ultraviolet light readable orientation marking to the outside surface of the battery label. The orientation marking may be applied prior to or following assembly of the label onto the battery, and may be coated with a clear film. The orientation marking is preferably located relative to the print on the battery label to enable orientation of the battery based on the detected position of the orientation marking.

Proceeding to step 74, a plurality of batteries is arranged on the orientation assembly. Once in place on the orientation assembly, the plurality of batteries is spun, preferably at a constant speed, by actuating the spin rollers. In order to detect the presence of the ultraviolet readable orientation marking, step 78 includes applying ultraviolet light to at least a portion of the battery containing the orientation marking so that the orientation marking phosphoresces and is readable when illuminated with ultraviolet light. Step 80 continuously monitors each of the batteries as they are spun to detect the presence of the orientation marking. When the corresponding photo detector detects the desired orientation of a particular battery, the solenoid actuated push member 30 aligned therewith is actuated in step 82 to force the battery 10 into position on the pickup assembly 22. Thereafter, in step 84, the oriented battery is disposed in a clear blister package, and the battery package assembly is completed in step 86 by adding the display card as is known in the battery packaging art. According to the orientation and packaging method 70 of the present invention, one or more products are positioned in a blister package having a desired orientation using an invisible orientation marking that does not interfere with the appearance of the product to consumers under normal ambient lighting conditions.

Accordingly, the product orientation arrangement of the present invention provides for the orientation of product, such as alkaline batteries, in a display package. While a plurality of batteries are oriented as described herein, it should be appreciated that the present invention may be used to orient any number of products in a package without departing from the spirit of the present invention. In addition, it should be appreciated that while an ultraviolet readable orientation marking is preferably employed, it is conceivable that other types of markings that are generally invisible to consumers under normal ambient light conditions may be employed.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. A method of arranging product in a display package according to a desired orientation, said method comprising the steps of:
    providing one or more products to be packaged;
    applying an invisible marking on said one or more products, said marking generally being indistinguishable to consumers under ambient light conditions;
    scanning each of said one or more products;
    detecting said marking on each of said one or more products;
    orienting each of said one or more products based on said detecting step; and
    disposing each of said oriented products in a package so that each of said one or more products has a desired orientation.

2. The method as defined in claim 1, wherein said step of applying said marking comprises applying an ultraviolet readable marking.

3. The method as defined in claim 2, wherein said step of detecting further comprises applying ultraviolet light to said one or more products so that said ultraviolet light readable marking phosphoresces.

4. The method as defined in claim 3, wherein said step of detecting includes detecting a predetermined color with a photo detector.

5. The method as defined in claim 1, wherein said step of scanning comprises rotating each of said one or more products relative to a detector.

6. The method as defined in claim 1, wherein said step of providing one or more products comprises providing one or more batteries for packaging in a battery display package.

7. The method as defined in claim 1, wherein said step of disposing said one or more products in a package comprises disposing said one or more products in a blister package.

8. A method of arranging batteries in a battery display package having a transparent window according to a desired orientation, said method comprising the steps of:
    providing one or more batteries to be packaged;
    applying an invisible marking on said one or more batteries, said marking generally being indistinguishable to consumers under ambient light conditions;
    scanning each of said one or more batteries;
    detecting said marking on each of said one or more batteries;
    orienting each of said one or more batteries based on said detecting step; and
    disposing each of said oriented batteries in a package so that each of said one or more batteries has a desired orientation.

9. The method as defined in claim 8, wherein said step of applying said marking comprises applying an ultraviolet readable marking.

10. The method as defined in claim 9, wherein said step of detecting further comprises applying ultraviolet light to said one or more batteries so that said ultraviolet light readable marking phosphoresces.

11. The method as defined in claim 8, wherein said step of detecting includes detecting a predetermined color with a photo detector.

12. The method as defined in claim 8, wherein said step of scanning comprises rotating each of said one or more batteries relative to a detector.

13. A system for packaging one or more products in a display package, said system comprising:

a marking device for applying an invisible orientation marking to each of one or more products, wherein said invisible orientation mark is generally indistinguishable to consumers under normal ambient light conditions;

a scanner for scanning each of said products to determine the location of the invisible orientation marking; and a pick up assembly for engaging each of said one or more products based on the detected orientation marking and placing each of said products in a display package so each of said products are oriented in a desired orientation according to the orientation marking.

14. The system as defined in claim 13, wherein said scanner comprises:

a source of ultraviolet light for phosphorescing said orientation marking; and a photo detector for detecting the orientation mark under ultraviolet light.

15. The system as defined in claim 13, wherein each of said one or more products comprises a battery.

16. The system as defined in claim 13, wherein said marking devices applies said invisible marking to a label on each of the one or more products.

17. A product display package containing one or more products arranged in a desired orientation, said package comprising:

a blister package having a housing defining a compartment for compactly housing product; and one or more products disposed in said blister package, each of said one or more products having an invisible orientation marking that is generally indistinguishable to consumers under normal ambient light conditions, wherein each of said one or more products are oriented in a desired orientation in said blister package based on said invisible orientation marking.

18. The package as defined in claim 17, wherein said package comprises a battery package for housing one or more batteries.

19. The package as defined in claim 17, wherein said invisible orientation marking comprises an ultraviolet light readable marking.

20. The package as defined in claim 17, wherein said blister package comprises a transparent window to allow viewing of the product in the package.

21. The package as defined in claim 17, wherein said marking is applied to the outer surface of a label.

* * * * *